Feb. 12, 1946.  J. E. WOODS  2,394,831
METHOD FOR REPAIRING HEAT EXCHANGERS
Filed Jan. 11, 1943
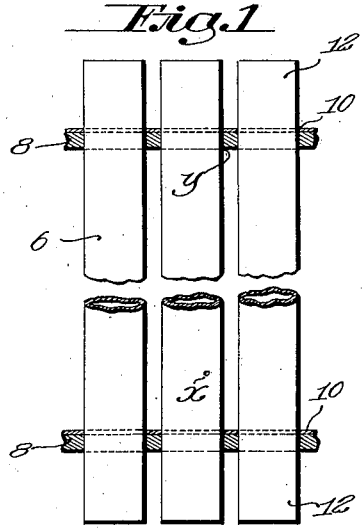
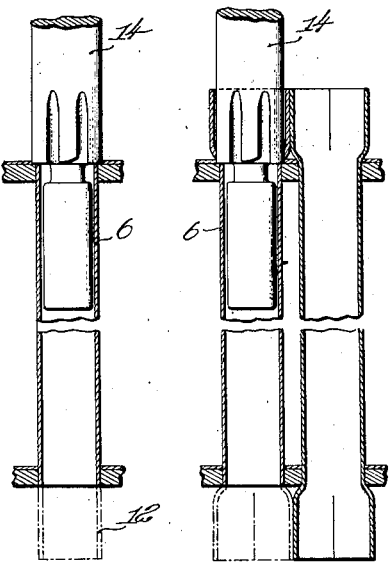
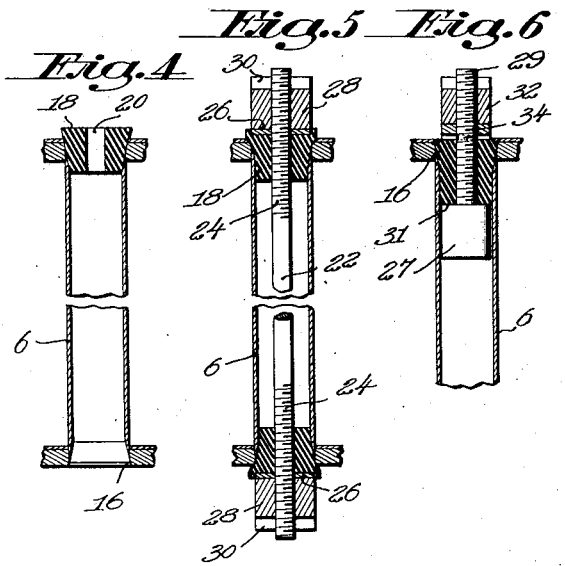
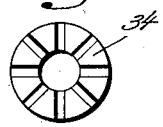
Witness
Frederick S. Greenleaf
Inventor
John E. Woods
by his attorneys
Fish Hildreth Cary & Kenney Patented Feb. 12, 1946

2,394,831

UNITED STATES PATENT OFFICE 2,394,831

METHOD FOR REPAIRING HEAT EXCHANGERS

John E. Woods, Brookline, Mass., assignor to Clifford Manufacturing Co., Boston, Mass., a corporation of Delaware Application January 11, 1943, Serial No. 471,997

4 Claims. (Cl. 29—157.4)

The present invention relates to method for repairing heat exchangers, and is more particularly concerned with the repair of defective tubes and joints in heat exchange apparatus of the general type shown in my Patent No. 2,303,247, granted November 24, 1942. This application is a continuation in part of my copending application, Serial No. 402,871, filed July 17, 1941.

My above-mentioned patent describes a heat exchanger employing a nest of thin-wall tubes secured by brazing into header plates, the ends of the tubes being preferably hexed to provide a reduced head resistance to the flow of fluid. As in any construction involving the use of thin-wall material, final inspection may indicate a small number of leaks. In my heat exchanger, the leaks may be due either to defective tubes or to defective joints between tubes and headers.

The principal object of the present invention is to provide a simple and convenient method for repair of such defects, which may be applied in the same way, whether the leak is in the tube itself or in a joint between a tube and header.

Briefly, the present invention depends on the fact that in a construction of this type, involving a large number of tubes, a few tubes which have been found to be defective may be permanently cut out of service without materially reducing the capacity of the equipment. Accordingly, with the above object in view, the principal feature of the invention contemplates cutting off a defective tube flush with the headers, reaming the tube to expose sealing surfaces on the headers, and plugging the tube permanently with compressible material to render the tube ineffective.

In the accompanying drawing, Fig. 1 is a detail sectional view of a portion of the equipment, showing thin-wall tubes in a header assembly; Fig. 2 is a detail view illustrating the method of cutting off a defective tube; Fig. 3 is a view similar to Fig. 2, showing the cutting off of a defective tube after the tube ends have been hexed; Fig. 4 is a detail view showing the tube after reaming and with a repair plug in place; Fig. 5 is a sectional view of the complete repair assembly; Fig. 6 is a sectional view of a modified and in some respects preferable form of repair assembly; and Fig. 7 is a bottom view of one of the parts used in the construction of Fig. 6.

The portion of the heat exchange apparatus shown in Fig. 1 comprises a round thin-wall tube 6, secured in headers 8 by brazing compound indicated at 10. The method of assembling the tubes in the headers and securing them thereto is described in my patent above referred to. Briefly, the method of manufacture comprises mounting the tubes in the headers, applying a measured and limited amount of brazing material to flow into each joint, and then brazing by furnace heating the whole core assembly or dipping it in a bath of molten material, such as fluxing compound, at a sufficiently high temperature to melt the brazing compound. The ends 12 of the tubes protrude through the headers, and these ends are thereafter hexed to provide a honeycomb end structure of low head resistance. The hexed tubes are shown in Fig. 3.

The testing and inspection of the tubes may be carried out either before or after hexing. A small percentage of the tubes may indicate leaks, either in the tubes themselves, as shown at $x$ in Fig. 1, or in the joint between a tube and a header, as indicated at $y$. In either case, the tube is first cut off flush with the headers by a counterboring tool 14, shown in Fig. 2. If the tubes have been hexed before inspection, the cutting operation is carried out as shown in Fig. 3; the tool simply frees the hexed end portion of the tube from the remainder thereof.

After the cutting operation, the ends of the tube are reamed, preferably with a taper-reamer, which is inserted sufficiently far into the tube to cut slightly into the header, as indicated in Fig. 4, thereby exposing a ring 16 of header surface.

The ends of the tube are then plugged with conical plugs of the shape indicated at 18 in Fig. 4. Each plug has a conical surface corresponding to the taper of the ream, so that a tight joint is formed between the plug and the reamed header surface 16. The plugs are made of compressible material which, upon application of endwise pressure, forms a fluid-tight joint between the plugs and headers. Preferably the plugs are made of a resilient material, such as neoprene or other rubber-like material which is capable of resisting the temperature ordinarily encountered in apparatus of this character. Alternatively, the plugs may be of soft metal, such as lead, when the equipment is to be used under conditions where electrolysis will not develop.

Each plug 18 is formed with a central opening 20. A rod 22, which is threaded at its ends as indicated at 24, is passed through the openings of the plugs and through the full length of the tube 6. Washers 26 are then placed over each plug and the plugs are tightly and permanently compressed into the tube ends by nuts, 28, each of which is preferably provided with a slot 30 to permit tightening thereof with a special screw driver.

The construction illustrated in Fig. 6 utilizes a member supported at the end only of the tube. The tube is taper-reamed at 16 as before, and the plug assembly is inserted. The assembly comprises a bolt having a head 27 of smaller diameter than the tube, and a shank 29 on which is mounted a cylindrical neoprene plug 31. The plug is initially of slightly smaller diameter than the tube but is compressible endwise by means of a slotted nut 32 to cause it to engage tightly against the interior tube wall as well as the taper-reamed portion 16. A washer 34 which is preferably notched on the side adjacent the plug, as shown in Fig. 7, is applied between the nut and the plug.

For a header leak, a single plug assembly may be used as in Fig. 6. For a tube leak, both ends of the tube are sealed off by plugs. In any case, insertion of the plug member is easily accomplished. The nut 32 is tightened to such an extent that the plug, upon insertion, has some frictional engagement with the tube wall. This initial engagement is sufficient to permit the nut 32 to be turned down tightly, thereby anchoring the plug in the tube and exerting full sealing pressure around the ring 16.

It will be seen that a leaky tube is completely cut out of service and has no effect on the operation of the equipment, except by an inconsequential reduction of capacity. The method is equally effective, whether the leak is in the tube wall itself, as indicated at x in Fig. 1, or in the joint between the tube and one of the headers, as indicated at y, since in the latter case the leak is sealed off by the engagement of the plug with the sealing ring 16 formed in the header surface. An important advantage of the invention is that leaks may readily be repaired in the field.

Having thus described my invention, I claim:

1. A method of repairing tube leaks and leaks between tubes and headers in a heat exchanger of the type comprising an assembly of thin-wall tubes in headers through which the tube ends protrude, which consists in cutting off flush with the headers the ends of a tube exhibiting a tube leak or a leak between tube and header, reaming the tube ends to expose sealing surfaces on the headers, inserting plugs of compressible material into the open ends of the tube, and applying means to compress the plugs axially and secure them in engagement with the tube and headers.

2. A method of repairing a heat exchanger of the type comprising an assembly of thin-wall tubes in headers through which the tube ends protrude, which consists in cutting off flush with the header the end of a tube exhibiting a leak between the tube and said header, reaming the tube end to expose a sealing surface on the header, inserting a plug of compressible material into the open end of the tube, and applying means to compress the plug axially and secure it in engagement with the tube and header.

3. A method of repairing tube leaks and leaks between tubes and headers in a heat exchanger of the type comprising an assembly of thin-wall tubes in headers through which the tube ends protrude, which consists in cutting off flush with the headers the ends of a tube exhibiting a tube leak or a leak between the tube and header, reaming the tube ends to expose sealing surfaces on the headers, inserting plugs of compressible material containing individual compressing means into the open ends of the tube, and actuating the compressing means to expand the plugs radially and thereby independently secure the plugs within the tube ends in engagement with the headers.

4. A method of repairing a heat exchanger of the type comprising an assembly of thin-wall tubes in headers through which the tube ends protrude, which consists in cutting off flush with the header the end of a tube exhibiting a leak between the tube and said header, reaming the tube end to expose a sealing surface on the header, inserting into the open end of the tube a plug of compressible material containing means for axially compressing the plug, the plug and compressing means occupying only a short section of the tube adjacent the leak, and actuating the plug compressing means at one end only to expand the plug radially into engagement with the tube and header.

JOHN E. WOODS.